W. H. DONNER.
ROLLING BLACK PLATES OR SHEETS.
APPLICATION FILED JUNE 18, 1909.
Reissued Nov. 22, 1910. 13,173.
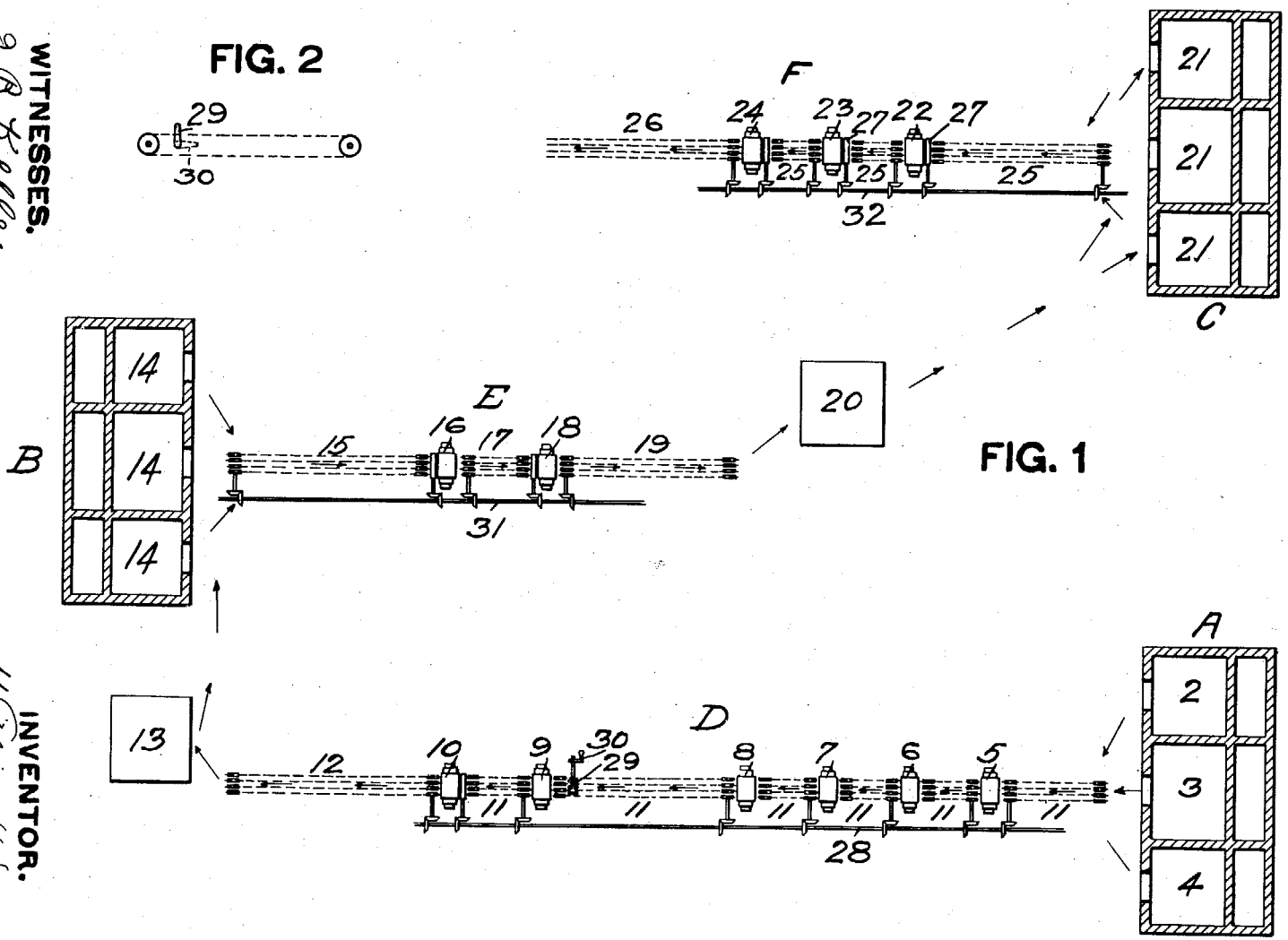
WITNESSES.
J. R. Keller
Robert C. Potter
INVENTOR.
William H. Donner
By Kay & Potter
attorneys

UNITED STATES PATENT OFFICE.

WILLIAM H. DONNER, OF PITTSBURG, PENNSYLVANIA, ASSIGNOR TO PERCY E. DONNER, OF PITTSBURG, PENNSYLVANIA.

ROLLING BLACK PLATES OR SHEETS.

13,173. Specification of Reissued Letters Patent. Reissued Nov. 22, 1910.

Original No. 620,541, dated February 28, 1899, Serial No. 701,309. Application for reissue filed June 18, 1909. Serial No. 503,043.

*To all whom it may concern:*

Be it known that I, WILLIAM H. DONNER, of Pittsburg, county of Allegheny, in the State of Pennsylvania, formerly of Monessen, in the county of Westmoreland, in said State, have invented a new and useful Improvement in Rolling Black Plates or Sheets, of which the following is a full, clear, and exact description, reference being had to the accompanying drawings, forming part of this specification, in which—

Figure 1 is a diagrammatic plan view, partly in section, showing a plant for the rolling of black sheets or plates constructed in accordance with my invention; and Fig. 2 is a detail view of a stop mechanism.

Heretofore in sheet-rolling mills wherein bars are reduced to thin sheets it has been customary to feed the bars through a set of two-high rolls and then return them over their tops for the next pass, the screws of the rolls being successively adjusted to bring the rolls closer together for each pass. This operation is continued until the iron is too cold to roll, when the packs are returned to the furnace and being reheated are then given a second series of reductions until they are rolled sufficiently long for doubling, when they are doubled and returned to the furnace, these operations being continued until the desired gage is obtained. In the usual operation after the doubles are all rolled into fours one pack is taken out, rolled and doubled into eights, during which operation the pack again cools and is again put back into the same furnace with the remaining packs of fours, this cool pack tending to cool and harden the other packs in the furnace. The remaining packs of fours are similarly rolled successively into eights and replaced in the same furnace-chamber, and the packs of eights are then successively taken out and rolled and finished. The placing of the cooled packs of fours in which the doubles tends to harden and chill the doubles and render them unfit for rolling, and the cooled packs of eights have the same action upon the packs of fours. This hardening of the packs being heated is overcome to some extent by raising the temperature and making the heat more intense; but this action is objectionable, as it tends to scale the iron and to pit its surface. The heating of the packs demands a high degree of skill, as there are several packs in the same chamber at the same time and each pack inserted must be placed so that it will not interfere with the taking out of the other packs to be worked.

The object of my invention is to provide a plant and method of working the metal whereby the time and labor consumed in passing the metal back over the rolls is obviated and the iron reduced more rapidly and without changing the adjustments of the rolls.

A further object is to provide a plant of this character wherein the metal after each set of reductions is reheated in a furnace-chamber at a point remote from the sets of packs which has been subjected to one less series of reductions, and to obtain a continuous plant wherein the various sets of rolls in the train are maintained at substantially the same temperature and proper contour by reason of the metal passing therethrough in a continuous or regular manner, thus giving more accurate sheets and reducing the liability of breaking the rolls.

In the drawings A represents a heating-furnace having chambers 2, 3 and 4, in which the bars are heated. This furnace may be provided with one or as many chambers as desired. When the bars are brought to the proper heat in this furnace, they are taken to a continuous train D, and by this I mean an uninterrupted series of connected rolls working as one system, the train D consisting of several sets of two-high rolls, of which I have shown six sets, arranged in tandem; numbered respectively 5, 6, 7, 8, 9 and 10, each set of rolls being provided with a feed table or conveyer 11, which is shown as consisting of a series of sprocket-chains passing over positively-driven sprocket-wheels at their ends, though other forms of positively-driven feed-tables may be employed, if desired. I have shown the sprocket-wheels at one end of the feed-table chains as mounted upon a shaft having bevel-gear connections with a shaft 28, extending alongside the continuous train, though these chains may be driven by any other desired mechanism. The metal being placed upon the first feed-table passes through the set of rolls 5 and being reduced therein emerges upon the second feed-table, which carries it to the rolls 6, in which it receives a further reduction, and thence passes on in a similar manner through the sets of rolls 7 and 8. The next set of rolls 9 in the continuous train is spaced a sufficient distance from the set 8 so that the plates may be matched at this point, if desired, the feed-table between the rolls 8 and 9 being correspondingly lengthened for this purpose. To stop the plates upon the table between the rolls 8 and 9, I show tilting fingers 29, arranged between the chains near the end of this table and arranged to be swung into upper position to stop the metal or lowered into inoperative position by a lever 30. From roll 9 the metal passes through set 10, and on emerging from this set of rolls the metal, which has now been reduced to a suitable gage for doubling, emerges upon a feed-table 12, by which it is carried to a doubler 13, upon which it is suitably doubled and taken to the furnace B, having chambers 14, in which the doubled pack is reheated. The pack being heated in one of the chambers of this furnace is drawn out and reduced in the continuous train E, it being first placed upon a conveyer 15 and carried to a set of rolls 16, in which it is reduced and emerges upon a feed-table 17, by which it is carried to another set of rolls 18, in which it is further reduced and drops upon the feed-table 19, by which it is taken to the doubler 20. After being doubled therein the pack is then taken to a reheating-furnace C and being reheated in one of the chambers 21 thereof is taken to a third continuous train F, consisting of three sets of rolls 22, 23 and 24, having feed-tables or conveyers 25 similar to those of the other trains. The metal passing through these three sets of rolls is reduced therein to the proper gage of sheets and emerges upon a conveyer 26.

The chain-tables of the continuous trains E and F may be driven from the shafts 31 and 32, respectively, in a similar manner to the feed-tables of the train D.

In order to prevent twisting or spreading of the pack between the sets of rolls after it has been reduced in gage to a point where this may occur, I preferably provide in front of and closely adjacent to the reducing-rolls small rollers 27, which act upon the packs passing through these rolls, guiding them and preventing twisting and spreading by their action upon the surface of the sheets in the same manner as a workman operating with tongs. I have shown these rollers as used upon the last six sets of the reducing-rolls; but they may of course be placed wherever necessity demands between the rolls. The rollers are of especial advantage when employed in connection with the conveying-chains, as shown, and may be driven by connections with the shafts 31 and 32, as shown in the drawings.

The number of continuous trains, as well as the number of sets of rolls in each train, may be varied as desired without departing from my invention, according to the number of reductions and the gage of sheet which are desired.

The advantages of my invention will be apparent to those skilled in the art, since the labor and time of reducing the metal are greatly decreased, a greater number of reductions can be given before reheating the pack, and the number of workmen is materially reduced. Since I use one pair of rolls for each reduction instead of making several reductions on one mill, the reductions are more uniform and accurate than where the adjustments are being continually changed. The adjustments of the tension of the rolls which regulates these reductions are made easy for an unskilled workman, whereas the adjustment by the ordinary method heretofore used requires the close attention of a skilled roller. The bars, sheets and packs being fed to the several sets of rolls in the train in a continuous and regular manner, such sets of rolls are kept at a substantially uniform temperature, and hence at about the same contour or shape, giving more accurate sheets than formerly and avoiding breakage of the rolls by reason of contracting and expanding thereof.

Many variations may be made in the form and arrangement of the rolls, the conveyers, and the furnaces, without departing from my invention, since

I claim:

1. In the manufacture of black plates or sheets, a heating furnace, a continuous train made up of several sets of rolls arranged adjacent thereto in tandem, a doubler arranged to act upon the metal after passing through the continuous train, a heating-furnace to which the doubled pack is taken, and another continuous train to which the metal is taken from the latter furnace; substantially as described.

2. The method of making black-sheets, which consists in rolling a series of heated packs successively by passing each pack through the several sets of rolls of a continuous train, doubling each pack, reheating the doubled packs in series, rolling each pack successively by passing it through the several sets of rolls of a second continuous train, and continuously supplying the packs to the furnaces and to the continuous trains; substantially as described.

3. The method of making black-sheets, which consists in rolling a series of heated packs successively by passing them through a continuous train made up of separate sets of rolls, doubling the rolled packs, placing the doubled packs in a series in a furnace-chamber at a point remote from those being rolled, rolling each pack successively by passing it through a second continuous train of rolls and supplying the packs in series to the furnaces and to the rolls, so as to keep the latter at a substantially uniform temperature; substantially as described.

4. In a plant for rolling black-plate, a continuous train made up of several coöperating sets of sheet rolls, having two of the sets of rolls in said train sufficiently removed from each other to allow the bars or sheets to be matched between said sets of rolls, and matching mechanism between said sets of rolls.

5. The method of rolling black-plate, consisting in feeding the sheet bars separately and successively through several coöperating sets of rolls in a continuous train, stopping and holding one plate between two of the sets of rolls of the train until another plate comes up and is matched with it, and then passing the pack so formed through the other sets of rolls in the continuous train.

6. In the manufacture of black plates or sheets, the combination with a set of rolls, of driven chains arranged to carry the plates or sheets to said rolls, and rollers in front of the rolls and arranged to prevent twisting or spreading of the metal; substantially as described.

7. In a plant for the manufacture of black-plate, the combination with several continuous trains, each made up of two or more sets of rolls arranged in tandem, of furnaces arranged between the trains and arranged to heat the metal coming from each train; substantially as described.

8. In the manufacture of black-plates or sheets, a heating-furnace, a continuous train made up of several sets of rolls arranged in tandem, a doubler arranged to act upon the metal after passing through the continuous train, a heating furnace to which the doubled pack is taken, another continuous train to which the metal is taken from the latter furnace, and positively-driven feed mechanism between the sets of rolls of each continuous train, substantially as described.

In testimony whereof I have hereunto set my hand.

WILLIAM H. DONNER.

Witnesses:
ROBERT N. DONNER,
ROBERT C. TOTTEN.